March 31, 1970        A. KATZ        3,503,243
METHOD OF MAKING EXTRUDED TUBING
Filed April 14, 1967
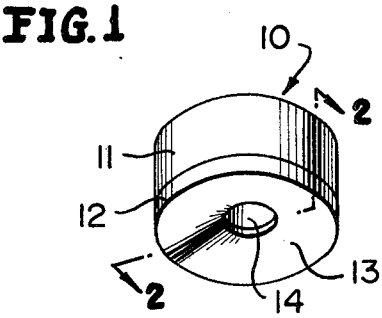
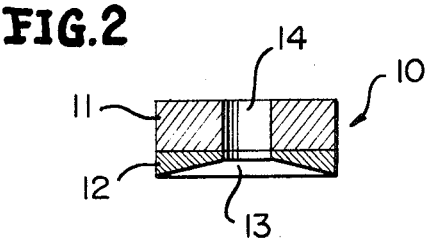
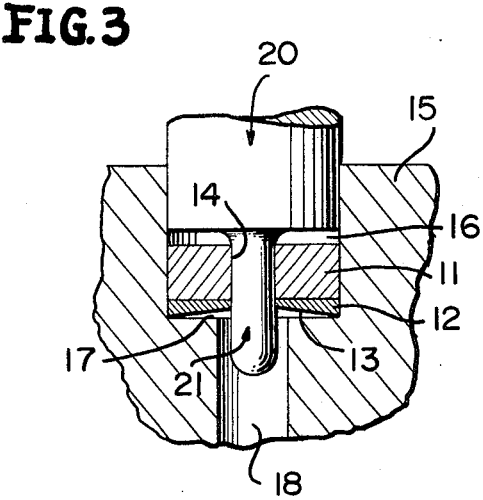
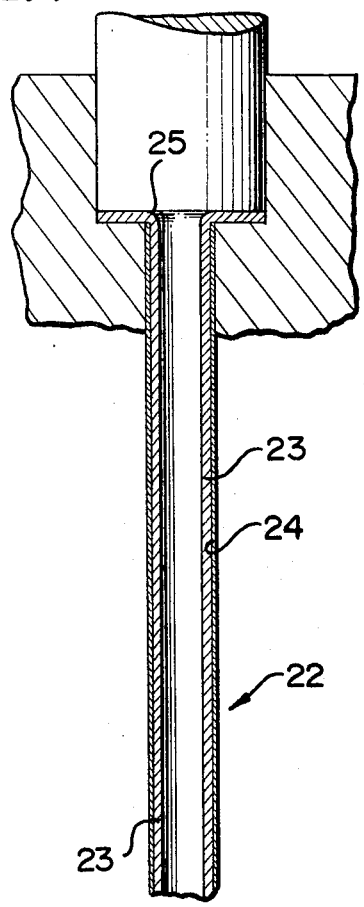
INVENTOR
ALBERT KATZ
BY
ATTORNEYS 4,503,243
Patented Mar. 31, 1970

3,503,243
METHOD OF MAKING EXTRUDED TUBING
Albert Katz, Cleveland, Ohio, assignor to Parker-Hannifin Corporation, Cleveland, Ohio, a corporation of Ohio
Filed Apr. 14, 1967, Ser. No. 630,974
Int. Cl. B21c 23/22
U.S. Cl. 72—258    13 Claims

ABSTRACT OF THE DISCLOSURE

A method of making brazing alloy coated extruded tubing wherein a bi-metallic slug having a first portion of brazing alloy and a second portion of a base metal is impact extruded to provide a tube of base metal with a brazing alloy coating of uniform thickness therein. To obtain such uniform thickness the brazing alloy portion of the slug is provided with a conical depression that is positioned adjacent the extrusion aperture of an extrusion die and the slug is then forced through the aperture to form the coated extruded tube.

DISCLOSURE

Impact extruded tubes are used, for example, in automotive radiators because they are cheap to produce. The tubes are brazed to cooling fins and headers to make a complete radiator. At the present time it is the practice to coat the fins and headers with braze metal, assemble the tubes thereto and braze the parts together by heating the same to cause the braze metal on the fins and headers to adhere to the uncoated tubes. The fins and headers have much greater area than the tubes and hence a great deal more braze material is used than would be the case if the tubes were coated instead of the fins and headers. The present invention, by providing a reliable method of impact extruding tubes with a uniform coating of braze metal permits their use with uncoated fins and headers for more economical production of automobile radiators.

In previous attempts to form coated tubes by impact extrusion, bi-metallic slugs have been utilized but the tubes have been unsatisfactory for articles such as automobile radiators because of the inability to obtain uniform thickness of the braze metal coating. Among such previous methods has been the use of a bi-metallic slug in the form of adjacent washers, one of base metal and the other of brazing alloy, the washers having flat faces and the washers being receivable in a die recess having a bottom wall with an extrusion aperture therein. The bottom wall of the recess has been either straight across or has been concavely conical. These methods have invariably resulted in uneven coatings having greatest thickness along the first formed portion of the tube.

In other previous methods the bi-metallic slug has been formed by encircling a thick base metal washer with a close fitting tubular section of braze metal, the bottom of the slug being straight across and the die recess having a concavely conical face leading to the extrusion aperture. Such arrangements have resulted in extruded tubes having little or no braze metal coating along the first formed portion of the tube and an increasing thickness of coating toward the last formed portion.

In view of the foregoing it is an object of this invention to provide a method of forming impact extruded tubing having a substantially uniform thickness of braze metal coating throughout the length of the tube. This is accomplished by providing a bi-metallic slug composed of an upper portion of base metal having a flat straight across bottom face and a lower slug portion of braze metal having a flat straight across upper face adhered to the lower face of the upper slug portion and having a conically recessed lower face, positioning the slug in a die recess having a flat straight across bottom wall opposite the conical recess and forcing the slug through an extrusion aperture in such bottom wall.

Other objects will be apparent from the following description and from the drawings in which:

FIG. 1 is a perspective view of the bi-metallic slug.

FIG. 2 is a cross section view of the slug taken along the lines 2—2 of FIG. 1.

FIG. 3 is a fragmentary cross sectional view of an extrusion die with the slug therein.

FIG. 4 is a view similar to FIG. 3 but showing completion of the extrusion operation with the slug converted to a coated tube.

As shown in FIGS. 1 and 2, bi-metallic slug 10 is composed of an upper portion 11 of a base metal and a bottom portion 12 of brazing alloy. The upper portion is flat and straight across at both its ends. The bottom portion 12 is flat and straight across at its upper end but its lower end has a concave conical surface 13 that is at an angle of about 10° to a horizontal plane, that is, the included angle of the concave conical surface 13 is about 160°. The slug is preferably circular at its outer periphery and has a circular opening 14 through both the upper and lower portions that is coaxial with conical surface 13. The outer diameter of the slug is approximately 3½ to 4 times its inner diameter and the thickness of the lower portion 12 at its other diameter is about 3 times its thickness at its inner diameter. The upper slug portion 11 is adhered to the bottom portion 12 by diffusion bonding. Such bonding is accomplished, for example, by the well known method of rolling together under pressure a plate of base metal and a plate of braze metal while both are at a temperature of about 900°. The slugs are then punched from the composite plate and conical surface 13 is formed by machining or by some other convenient method.

To form a clad tube, slug 10 is placed as shown in FIG. 3 within an extrusion die 15 having a cylindrical cavity 16 with a flat bottom wall 17 and an extrusion aperture 18. A piston 20 having a mandrel 21 is inserted into cavity 16 with mandrel 21 extending through opening 14 of the slug with a loose sliding fit therewith.

Upon application of force to piston 20, metal from slug portions 11 and 12 is forced through extrusion aperture 18 between the wall thereof and the lower end of mandrel 21 to form a clad tube 22 comprising an inner tube 23 of base metal from slug portion 11 and a uniform coating 24 of braze metal from slug portion 12.

The movement of piston 20 is preferably halted just prior to its contacting of recess bottom wall 17, forming a flange 25 upon the extruded clad tube that may be trimmed off if so desired.

For use as a radiator tube, good results are obtained when the upper slug portion 11 is made of soft annealed aluminum of about 99.5% purity and the lower slug portion 12 is a brazing alloy having approximately 6.8% to 8.2% silicon, 0.25% copper, 0.80% iron, and 0.20% zinc, and the remainder being of aluminum. However, it is obvious that other desired materials may be employed.

For extruding a 20" long tube of ⅜" outside diameter and about .020" wall a bi-metallic slug of the materials indicated will produce good results if it has an opening therethrough of approximately .350", an outer diameter of about 1.310", a height of .551", and with the lower slug portion having a conical recess of 160° included angle and a thickness at its outer margin of .135". The diameter of mandrel 21 is .335" to provide a loose fit within opening 14 and the diameter of aperture 18 is .375".

Although one example of the composition and proportions of the slug have been illustrated and described, it is apparent that many variations may be made in the same

I claim:

1. The method of making impact extruded clad tubing comprising the steps of placing an annular slug having upper and lower portions of different materials into a recess in an extrusion die, orienting an upward extending depression formed in the bottom face of the lower slug portion adjacent and overlying an aperture in a bottom wall of the recess with the center of said depression in alignment with the center of said aperture, and forcing the materials of the upper and lower slug portions through the aperture to form a tube from the material of the upper slug portion and to form a coating from the material of the lower slug portion onto the outer wall of the tube.

2. The method of claim 1 including providing as said recess a recess having a bottom wall in the plane substantially normal to the axis of the aperture.

3. The method of claim 1 including providing said depression in the form of a conical recess, and orienting said recess with the apex of the cone defining said conical recess on the axis of said aperture away from said bottom face toward the upper portion of said annular slug.

4. The method of claim 1 in which said upper slug portion is aluminum and said second slug portion is a brazing alloy.

5. The method of claim 3 including providing as said conical recess a conical recess having a surface which forms an angle of approximately 10° to a plane normal to the axis of said aperture.

6. The method of claim 1 including providing upper and lower slug portions having adjacent transverse faces which are substantially normal to the axis of the aperture and are in adhering contact throughout substantially their entire extent.

7. The method of claim 1 including forcing said materials through said aperture with a punch having a mandrel extending through the annular slug portions and having a loose fit therewith.

8. The method of claim 1 including attaching said slug portions to each other by diffusion bonding.

9. The method of claim 1 including providing as the annular slug a slug having an outer diameter between 3½ and 4 times its inner diameter.

10. The method of making an impact extruded clad tube including the steps of placing a slug having an upper portion of a base metal, a lower portion of a brazing alloy, aligned central openings therethrough and contacting adjacent transverse faces in a recess of an extrusion die having a circular aperture in the bottom wall thereof; orienting a conical depression formed on the bottom face of said lower portion with the apex of the cone defining said conical depression on the axis of said aperture away from said bottom face toward said upper portion of said slug and in a plane substantially normal to the axis of said aperture; placing a piston having a mandrel extending through the openings of said slug portions and having a loose fit therewith in said recess; and advancing the piston into contact with the upper slug portion to force both slug portions through said aperture to form a clad tube having an inner section formed of said base metal and a coating of uniform thickness formed from the brazing alloy.

11. The method of claim 10 including providing as the upper slug portion a slug portion having a flat face contacting a flat face on the piston positioned in a plane substantially normal to the axis of said openings.

12. The method of claim 11 including providing as the recess a recess with a flat bottom wall, as the upper slug portion and the lower slug portion, portions having flat lower and upper faces respectively positioned in planes substantially normal to said axis of said openings, and providing as said conical depression a depression having a face substantially 10° inwardly divergent from the plane of said bottom wall.

13. The method of claim 12 including providing as said lower portion a lower portion having a thickness at its outer perimeter approximately three times its thickness at its radially inner margin.

References Cited

UNITED STATES PATENTS

| | | | |
|---|---|---|---|
| 3,744 | 11/1869 | Shaw | 72—258 |
| 1,599,572 | 9/1926 | Lusher | 72—266 |
| 3,114,203 | 12/1963 | Frank | 29—480 |
| 2,986,273 | 5/1961 | Bardgett | 72—258 |
| 2,955,222 | 10/1960 | Beesch | 313—141 |
| 1,948,242 | 2/1934 | Schubarth | 72—258 |
| 1,771,620 | 7/1930 | Ehrmann | 72—258 |
| 3,144,576 | 8/1964 | Hagmaier | 72—258 |

CHARLES W. LANHAM, Primary Examiner

ANDREW LEE HAVIS, Assistant Examiner

U.S. Cl. X.R.

29—190; 72—266, 700